US011092172B2

(12) United States Patent
Reust (10) Patent No.: US 11,092,172 B2
(45) Date of Patent: Aug. 17, 2021

(54) SEISMIC VIBRATOR SERVO VALVE WITH PROPORTIONAL LINEAR PRESSURE FEEDBACK

(71) Applicant: Dennis Keith Reust, Stillwater, OK (US)

(72) Inventor: Dennis Keith Reust, Stillwater, OK (US)

(*) Notice: Subject to any disclaimer, the term of this patent is extended or adjusted under 35 U.S.C. 154(b) by 0 days.

(21) Appl. No.: 16/926,679

(22) Filed: Jul. 11, 2020

(65) Prior Publication Data

US 2021/0010491 A1 Jan. 14, 2021

Related U.S. Application Data

(60) Provisional application No. 62/873,690, filed on Jul. 12, 2019.

(51) Int. Cl.
*F16K 11/07* (2006.01)
*F15B 13/04* (2006.01)
*F15B 13/043* (2006.01)

(52) U.S. Cl.
CPC ...... *F15B 13/0402* (2013.01); *F15B 13/0435* (2013.01); *F15B 13/0433* (2013.01); *F16K 11/0716* (2013.01)

(58) Field of Classification Search
CPC .............. F15B 13/0402; F15B 13/0435; F15B 13/0433; F15B 13/0431; F15B 21/12; F15B 2013/0428
See application file for complete search history.

(56) References Cited

U.S. PATENT DOCUMENTS

| 3,023,782 A | 3/1962 | Chaves, Jr. et al. |
| 3,059,483 A | 10/1962 | Clynch et al. |
| 3,126,031 A | 3/1964 | Hayner |
| 3,228,423 A | 1/1966 | Moog, Jr. |
| 3,260,273 A | 7/1966 | Hayner |

(Continued)

FOREIGN PATENT DOCUMENTS

EP 2600175 A1 5/2013

OTHER PUBLICATIONS

Stokoe, Kenneth H.; High-Amplitude Mobile Vibrator for Exciting Body and Surface Waves in Soil, Pavement and Structural Systems', retrieved on Mar. 19, 2021 from https://apps.dtic.mil/sti/citations/ADA210130.

(Continued)

*Primary Examiner* — Kelsey E Cary
(74) *Attorney, Agent, or Firm* — Robert H. Frantz (57) ABSTRACT

An improved servovalve for a seismic vibrator or vibration machine which includes a left additional passageway conducting a portion of sampled pressure from a left cylinder pressure chamber to only a portion of the right end drive surface of the spool, wherein the portion of the right end drive surface is less that of the entirety of the right end drive surface; and a right additional passageway conducting a portion of sampled pressure from a right cylinder pressure chamber to only a portion of the left end drive surface of the spool, wherein the portion of the left end drive surface is less that the entirety of the left end drive surface; thereby providing at least two additional passageways configured to provide linear proportional pressure feedback in spool movement control.

21 Claims, 4 Drawing Sheets

(56) References Cited

U.S. PATENT DOCUMENTS

| | | | |
|---|---|---|---|
| 3,280,935 A | 10/1966 | Brown | |
| 3,461,909 A | 8/1969 | Vohringer | |
| 3,858,170 A | 12/1974 | Freeman et al. | |
| 4,041,983 A * | 8/1977 | Bianchetta | F15B 13/0402 |
| | | | 137/625.63 |
| 4,118,611 A | 10/1978 | Harris | |
| 4,184,144 A | 1/1980 | Rickenbacker | |
| 4,265,331 A | 5/1981 | Leonard | |
| 4,450,928 A | 5/1984 | Weber et al. | |
| 4,637,002 A | 1/1987 | Sallas | |
| 4,646,274 A | 2/1987 | Martinez | |
| 4,679,591 A | 7/1987 | Maue et al. | |
| 4,682,669 A | 7/1987 | Weber | |
| 4,741,364 A | 5/1988 | Stoss et al. | |
| 4,751,687 A | 6/1988 | Christensen | |
| 4,864,546 A | 9/1989 | Russell et al. | |
| 5,128,908 A | 7/1992 | Reust | |
| 5,396,029 A | 3/1995 | Talke | |
| 6,269,733 B1 | 8/2001 | Reust | |
| 8,499,542 B2 * | 8/2013 | Zebrowski | F02C 7/236 |
| | | | 60/39.281 |
| 8,739,680 B2 | 6/2014 | Reust | |
| 9,651,692 B2 | 5/2017 | Buttin | |
| 2007/0032959 A1 | 2/2007 | Jaulin et al. | |
| 2008/0008040 A1 | 1/2008 | Laycock | |
| 2011/0168012 A1 * | 7/2011 | Reust | F16K 11/0716 |
| | | | 91/363 R |
| 2018/0245607 A1 * | 8/2018 | Briancon Marjollet | |
| | | | G05D 16/2097 |

OTHER PUBLICATIONS

PSI Repair Team; "Repairing Hydraulic Servo Valves in Seismic Vibrator Trucks", retrieved from https://www.psi-repair.com on Mar. 10, 2021.

Bourcard et al.; "Low frequency sweep control with Nomad-65, VE464 and CheckSweep"; retrieved on Mar. 26, 2021 from https://www.sercel.com.

Reust, Dennis K.; "Hydraulics Delivers Good Vibrations", Oct. 1, 2013, Hydraulics and Pneumatics.

Terrex Group; "Terrex Services" brochure; retrieved on Mar. 10, 2021 from https://docplayer.net/78855540-Terrex-group-services.html.

Industrial Vehicles International; "Products", retrieved on Mar. 19, 2021 from http://www.indvehicles.com.

Tellier, et al; "Practical solutions for effective vibrator high-frequency generation"; copyright 2015.

* cited by examiner

SEISMIC VIBRATOR SERVO VALVE WITH PROPORTIONAL LINEAR PRESSURE FEEDBACK

FIELD OF THE INVENTION

This patent application claims benefit of the filing date of U.S. provisional patent application 62/873,690, filed on Jul. 12, 2019, by Dennis Keith Reust. This invention relates to the arts of control systems and methods for seismic vibrators and vibrating machines.

BACKGROUND OF INVENTION

This invention applies to a servo controlled hydraulic vibrator apparatus used typically in the seismic surveying process. Such a vibrator system has an earth contacting baseplate which vibrates to provide energy for seismic exploration. The baseplate is driven by an actuator which is a double acting hydraulic cylinder. The baseplate is rigidly attached to a piston rod which has an attached piston located between its two ends which extend from both ends of the hydraulic cylinder. The outside portion of the cylinder is heavy and serves as a reaction mass for the piston to work against in its reciprocating motion. The actuator is controlled by a hydraulic servo valve which ports high pressure hydraulic fluid from a hydraulic power supply and exhausts fluid back to the power supply under control of an electrical signal. Of interest in this field of engineering and technology are U.S. Pat. No. 3,023,782 (A. Chaves, Jr., et al); U.S. Pat. No. 3,228,423 (William C. Moog, Jr.); U.S. Pat. No. 4,184,144 (James E. Rickenbacker); U.S. Pat. No. 4,637,002 (John J. Sallas); U.S. Pat. No. 4,679,591 (Dale N. Mauel); U.S. Pat. No. 4,751,687 (Elmo W. Christenson); U.S. Pat. No. 3,126,031 (Paul F. Hayner); U.S. Pat. No. 3,260,273 (Paul F. Hayner); U.S. Pat. No. 4,741,364 (Kenneth J. Stoss and Richard A. Felland); U.S. Pat. No. 3,461,909 (Karl Vohringer); and U.S. Pat. No. 4,265,331 (Willie B. Leonard), for relevant background teachings.

Since the 1950's sonic energy has been used for geophysical exploration. You can compare it to sonar or to ultrasound imaging. Energy from a source is reflected from various layers in the earth, and the reflected signals over time are used to make maps of the under-surface geology. Dynamite was first used as the sonic source, and explosives are still used to this day in many instances.

Seismic sensors known as geophones or accelerometers are used by the thousands or the hundreds of thousands to receive reflected signals from deep inside the earth. These sensors are spread over a large area of the ground and the location of each one is recorded. Super computers process these signals with human guidance to make 3-D geological maps.

In the late 1950's, the Continental Oil Company (later Conoco and presently ConocoPhillips) in Ponca City, Okla., began to develop "The Vibroseis™ Method" of exploration which includes using "seismic vibrators" rather than dynamite as the energy source. The vibrator places its baseplate (speaker cone) directly onto the ground and uses the carrier vehicle's weight to hold it firmly in place while emitting a recognizable signal which is typically a long chirp compared to radar's short chirps. Vibrators may operate singly or in combination with others.

A seismic vibrator carries a heavy "reaction mass" of several thousand pounds. A vibrator actuator, which includes the reaction mass, is hydraulically lowered to the ground when the vehicle is in place. A diesel engine turns hydraulic pumps which supply fluid to the hydraulic lift system and to a servo valve. The servo valve ports fluid alternately into one chamber then the other of a large double-rod cylinder inside the reaction mass while simultaneously exhausting fluid from the opposite side.

Partially because hydraulic servo valves have low gain (20 to 50) compared to electronic amplifiers, vibrators have a much lower signal-to-noise ratio than electronic amplifiers. Noise is problematic. The cleaner a vibrator's signal, the better weak signals reflected from deep inside the earth can be separated from noise.

Typical hydraulic servo valves are designed to output hydraulic fluid at a flow rate proportional to an input signal. Flow rate into an actuator is proportional to its load's velocity. When a servo valve's spool is displaced in one direction from a center null position, hydraulic fluid flows from a pressure input port through the servo valve and out a first cylinder port. It flows into a first side of a hydraulic cylinder urging its piston to move in one direction. Simultaneously, pressure on the other side of the cylinder piston is relieved as its fluid flows through a second servo valve cylinder port and out a return port. As the valve spool's displacement from its center null position increases, flow increases. Similarly, when the spool moves in the other direction from null, fluid flows through the servo valve from the pressure port out the second cylinder port into the second side of a hydraulic cylinder, and pressure on the first side of the cylinder is relieved as flow enters the servo valve's first cylinder port and out the return port.

Hydraulic Actuators for Producing Force.

Some hydraulic actuators need force to be the primary output rather than velocity. The hydraulic pressure applied to the first side of a hydraulic cylinder piston multiplied by the piston's exposed area is the force urging that piston face to move away. Likewise, the pressure applied to the second side of the cylinder piston multiplied by that piston's exposed area is the force urging that piston face to move away. The difference in the forces applied to the two piston faces is the net force urging the cylinder piston to move in one direction. The piston is connected to a load by means of one or two rods attached to one or both piston faces. In the second case, the cylinder is a "double-rod cylinder" and its load can be connected at both ends of the cylinder. Hydraulic actuators other than cylinders exist, but except where stated otherwise, the terms "actuator" and "cylinder" in this disclosure refer generally to double-rod cylinders whose two piston rods have the same or similar diameter. In this case, fluid applies pressure to equal areas on the two piston faces, and the differential pressure across the cylinder piston is directly proportional to the net force which the cylinder applies to its load. Friction and other detractions are ignored in this disclosure.

Pressure Feedback in Seismic Vibrators.

Differential pressure on the two sides of a cylinder piston is equivalent to differential pressure at its two servo valve cylinder ports. This differential pressure may be used as negative feedback to urge the servo valve spool toward its null position. The higher the pressure difference across the cylinder, the more strongly the servo valve spool is urged toward its null position. Equilibrium is reached when the pilot valve and pressure feedback exert equal and opposite forces to move the valve spool and it stops moving.

The method of adjusting the feedback gain in the present inventor's U.S. Pat. No. 5,128,908, for example, is to change the diameter of orifices in the pressure sampling passageways. These orifices allow metered fluid representing cylinder pressure to modify the servo valve's control inputs from a pilot valve. The flow through an orifice is proportional to its open area multiplied by the square root of the pressure difference across the orifice. Flow is required to move the main spool, so this technique urges nonlinear spool velocity in response to pressure feedback magnitude. A 100-fold increase in pressure across an orifice increases the flow by only 10-fold. This technology can be very stable, and do a good job of correcting small and moderate pressure errors in a force control actuator. It has made a remarkable improvement in seismic vibrator technology since 1990. The present inventor's other patents, which are incorporated by reference into the present disclosure, have provided certain other improvements to servo valve technologies.

SUMMARY OF THE EXEMPLARY

Embodiments of the Invention

Disclosed are one or more embodiments of an improved control for a seismic vibrator or vibration machine which includes a left additional passageway conducting a portion of sampled pressure from a left cylinder pressure chamber to only a portion of the right end drive surface of the spool, wherein the portion of the right end drive surface is less that of the entirety of the right end drive surface; and a right additional passageway conducting a portion of sampled pressure from a right cylinder pressure chamber to only a portion of the left end drive surface of the spool, wherein the portion of the left end drive surface is less that the entirety of the left end drive surface; thereby providing at least two additional passageways configured to provide linear proportional pressure feedback in spool movement control.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF ONE OR MORE EXEMPLARY EMBODIMENTS OF THE INVENTION

The present inventor has recognized that existing technologies for servo valves, such as that disclosed in the present inventor's U.S. Pat. No. 5,128,908, for example, do not provide performance which is adequate to correct large pressure perturbations which occur at valve spool cross-over when seismic vibrators operate at very low frequencies.

Embodiments of this invention add a proportional linear pressure feedback feature to legacy seismic vibrator servo valve products, such as but not limited to those taught in the present inventor's U.S. Pat. Nos. 5,128,908 and 6,269,733 and 8,739,680, each of which provides nonlinear pressure feedback.

The present disclosure provides one or more improvement embodiments relative to the design taught in U.S. Pat. No. 5,128,908 for illustrative purposes only. Those skilled in the relevant arts will recognize that the disclosed improvement may be embodied in other servo valve designs without departing from the spirit and scope of the present invention.

With the addition of the improvements disclosed herein, a servo valve is better able to cancel large pressure errors such as the perturbations caused by valve cross-over. In addition, such improved servo valves are more capable of counteracting hydraulic power supply fluctuations. So, according to the benefits of the present invention, the actuator exhibits less distortion, and more nearly resembles an ideal force actuator which would produce output force directly proportional to an input signal.

Existing Servo Valves.

As previously mentioned, the improvements according to the present invention may be readily realized in conjunction with a range of existing servo valve designs. As such, it is useful to provide a general review of servo valve design and operation for reference, while the aforementioned patents provide greater detail available to the reader.

The servo valve design disclosed in the present inventor's U.S. Pat. No. 5,128,908 improved the signal-to-noise ratio of seismic vibrators. Products based on this design commonly called the "DR Valve" or "DR1 Valve" have been installed on a large number of the world's vibrators for the past 30 years. It was a modification "enhancement" of prior servo valves. In at least one embodiment, the present invention builds upon this widely accepted design as an improvement.

A vibrator's servo valve is made of two separable products: The pilot valve which can typically output up to 5 gallons per minute (5 GPM), and the main valve which can typically output up to 240 GPM, of hydraulic fluid. The pilot valve converts an electrical signal from an electronic controller into a differential hydraulic signal which drives the main valve. The present invention avoids changing the control electronics or the pilot valve, focusing on improving the main valve's performance.

Currently available servo valves produce output hydraulic fluid flow in proportion to the pilot valve's electrical input signal. A constant fluid flow into a cylinder results in constant cylinder velocity, so a vibrator's reaction mass is moved at controlled velocity.

However, the desired output from a vibrator is force, not velocity. Imagine a vibrator on damp clay. Its baseplate can move the surface with considerable velocity. Next, imagine operating the same vibrator on granite bedrock. Here, it can produce very little velocity. Since 1981, conventional wisdom among many who are skilled in the relevant arts has held that force is the desired output of a seismic vibrator, which compensates for differences in the surface upon which it is acting, and which better-represents far-field signals.

Improved Feedback System.

Figure 1:
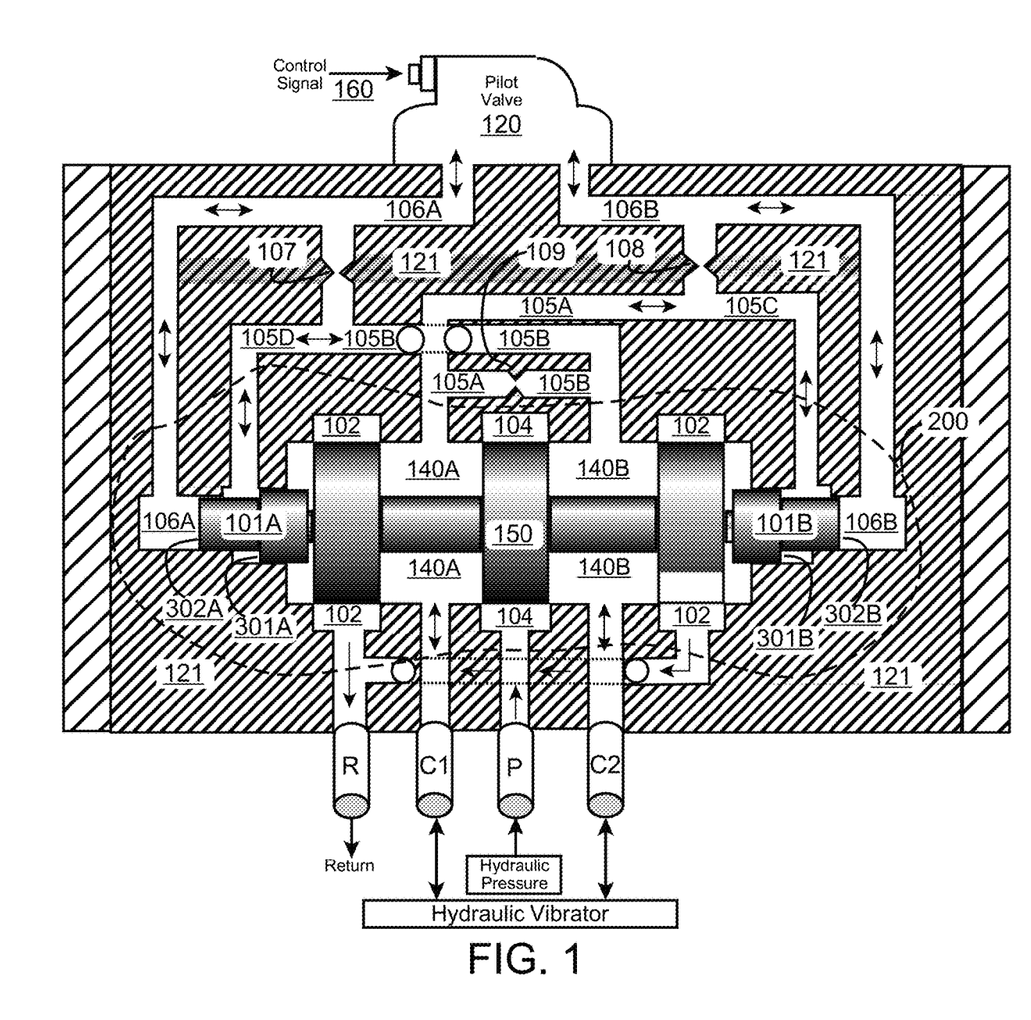
FIG. 1 provides a functional diagram of an example embodiment of an improved servo valve for a seismic vibrator or vibrating machine according to the present invention.

Referring to FIG. 1, a generalized cross-sectional view of example improved servo valve according to the present invention is shown. Prior technology includes a sliding circular valve spool 150 which can be moved from side to side (horizontally in FIG. 1) in a bored hole with multiple formed ports in a housing 121. A control signal 160 is received by a conventional pilot valve 120 (a.k.a. control valve), which controls the position of the sliding circular valve spool 150 by transferring flow of hydraulic oil (a.k.a. hydraulic fluid, or just "fluid" hereinafter) in and out of control ports 106A and 106B. The fluid from the pilot valve 120 connected through ports 106A and 106B applies differential pressure and flow to ends of the spool 150 or to optional new stub pistons 101A and 101B forcing the spool 150 to move from side to side in the bored hole.

Known stub pistons are of essentially uniform diameter, whereas one element of the present improvement is providing the steps in the diameter of the spool or of the stub pistons as discussed in the following paragraphs. Spool 150 is shown in FIG. 1 in its center null position. When the spool 150 moves to the right in the bored hole, pressurized fluid can flow through metering variable orifice 112A (see magnified view 200 of the bore and spool arrangement of FIG. 2) from passageway 104 into left cylinder pressure chamber 140A and cylinder port C1 to an actuator such as a hydraulic cylinder. Simultaneously, right cylinder pressure chamber 140B and cylinder port C2 are exhausted into return port 102 through metering variable orifice 111B (shown in magnified view 200 of FIG. 2).

Similar, but opposite in direction of spool motion, cylinder pressurization and exhaust is accomplished when spool 150 moves to the left in FIG. 1, such that metering variable orifice 112B (see magnified view 200 in FIG. 2) allows pressurized fluid to flow from passageway 104 into cylinder chamber 140B and cylinder port C2.

Presently available pressure feedback technology, such as that taught in U.S. Pat. No. 5,128,908, is accomplished by sampling cylinder pressure through ports 105A and 105B and allowing fluid through limiting orifices 107 and 108 to algebraically sum with the fluid pressures from the pilot valve 120 in passageways 106A and 106B. Pressure feedback is applied in negative polarity, so that it will tend to close the valve in response to cylinder pressure. As cylinder pressure increases, the tendency to close the valve increases. In order to maintain high cylinder pressure, a relatively large input signal of pressure from the pilot valve 120 is required to counter-balance pressure feedback. Using this technique, a servo valve outputs pressure in an approximation of direct proportionality to an input signal to the pilot valve 120 through connector 160. A damping orifice 109 between the cylinder ports promotes stability.

Orifices such as 107, 108, and 109 permit fluid flow in proportion to the square root of the pressure across each orifice. This limitation to fluid flow in proportion to pressure when the pressure difference across the orifice is large impedes the servo valve's correction of larger pressure errors, as the present inventor has recently discovered. In addition, fluid flow through orifices 107, 108, and 109 may reach maximum when the flow rate becomes supersonic. This further limits response to large pressure errors, as the present inventor has determined.

Embodiments of the present invention improve existing servo valve technology by including a new pressure feedback feature without significant restrictions which might cause nonlinearity. New passageways 105C and 105D directly apply pressure feedback to improved stub pistons 101A and 101B without intervening orifices. These new (additional) passageways may be realized as extensions to the existing feedback passageways 105A and 105B in some embodiments, and may be realized as separate new passageways in other embodiments, within the scope of the present invention.

Conventional stub pistons are improved by providing a step in each stub piston's diameter, each of which provides a new drive surface area associated with the steps in spool or stub piston diameter, on which the new feedback pressure counter-acts the pressure to cause spool opening. Pressure multiplied by the surface area equals the force applied. Gain is set by the relationship between the areas of the stepped stub piston faces and the area of the remaining end surface areas. In at least one embodiment, about 30% of the total stub piston end area (or modified spool end area) is assigned to direct pressure feedback.

As such, embodiments according to the present invention add a new feedback path and method to existing servo valve designs, in which the new feedback urges the valve spool to move in direct proportion (linear) to pressure errors. Continuing to refer to FIG. 1, actuator cylinder pressure C1 is sampled from left cylinder pressure 140A and propagates through passageway 105A to new passageway 105C to act on the surface of a new diameter step in stub piston 101B. The pressure acting on the new drive surface 301B of this piston step urges the spool 150 to move away (to the left in FIG. 1) with force proportional (linear) to the pressure at C1.

Likewise, cylinder pressure C2 is sampled from right cylinder pressure 140B and propagates through passageway 105B to new passageway 150D to a new diameter step in stub piston 101A. The pressure acting on the new face 301A of this new step urges the spool 150 to move away (to the right in FIG. 1) with force proportional to the pressure at C2. Therefore, differential pressure, $P_{diff}$=C1-C2, provides a proportional net force on the stepped stub pistons 101A and 101B and thereby on spool 150 urging the spool to return to its center (null) position.

Pilot valve 120, according to one aspect of the present improvement, applies a differential force and flow on stub pistons 101A and 101B step down end areas 302A and 302B, in an alternating sequence causing movement of the spool 150, through passageways 106A and 106B. The pilot valve's output is modified by pressure feedback through limiting orifices 107 and 108. The modified pilot valve output must overcome pressure feedback in order to move the spool 150 from its null position. When there is little differential actuator pressure C1 and C2, a small signal to the pilot through connector 160 is sufficient to move or hold the spool away from its null position. When there is greater differential actuator pressure C1 and C2, a large signal to the pilot valve 120 through connector 160 is required to move or hold the spool away from its null position.

Velocity of the spool 150 is directly proportional to the fluid flow to the spool driving surface areas whether directly on spool ends or through stub pistons. Limiting orifices 107 and 108 limit fluid flow and thus spool velocity due to pressure feedback, and therefore limit the speed with which large pressure errors can be corrected. End area steps in the stub pistons with virtually unrestricted access to cylinder pressure through passageways 105C and 105D avoid or significantly reduce this limitation. In this example embodiment, the benefits of the pressure feedback means of the design disclosed in U.S. Pat. No. 5,128,908 are retained because experiments show that the old method and the new improvement method work well together. This may be because limiting orifices 107 and 108 serve to moderate pressure feedback somewhat as the actuator load changes, and reduce sensitivity to pilot wear and leakage by providing intentional leakage through orifices 107, 108, and 109.

Figure 2:
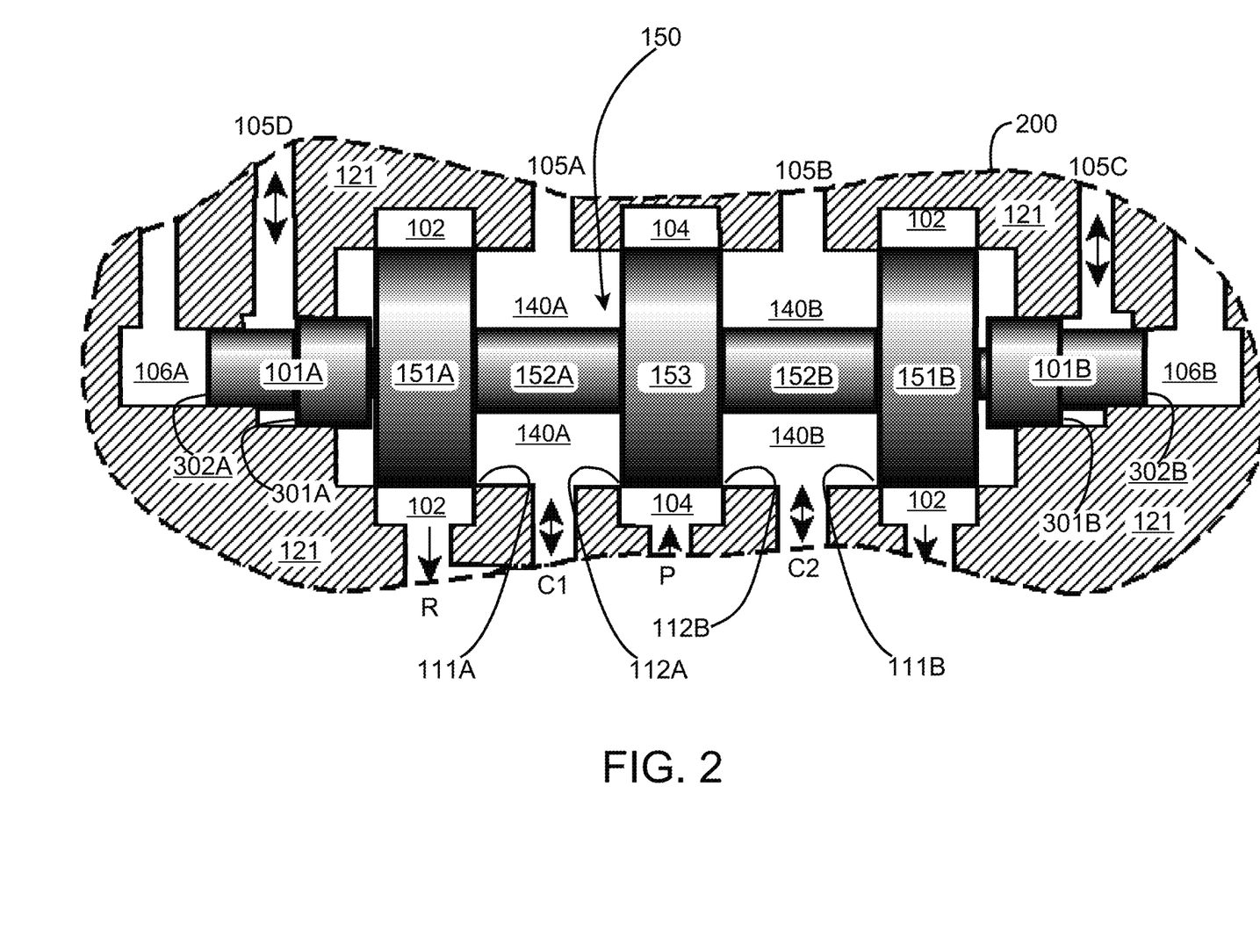
FIG. 2 provides enlarged details of the bore and spool portion of the example embodiment of FIG. 1

FIG. 2 provides a magnified partial view 200 of the bore and spool portion of the example embodiment of FIG. 1, including designation of metering variable orifices 112A and 112B which allow pressure P from the volume 104 surrounding the center piston 153 to enter the volumes defined by left cylinder pressure 140A and right cylinder pressure 140B surrounding the rods 152A and 152B when the spool 150 is displaced left or right from null such that the edges of piston 153 do not block entry of pressurized fluid through port P.

FIG. 2 also designates variable orifices 111A and 111B which allow pressurized fluid to escape from the volumes defined by left cylinder pressure 140A and right cylinder pressure 140B surrounding rods 152A and 152B to the return R conduit via the volumes 102 surrounding pistons 151A and 151B when the spool 150 is displaced right or left from null such that the edges of the end pistons 151A and 151B do not block exit of fluid.

Figure 3:
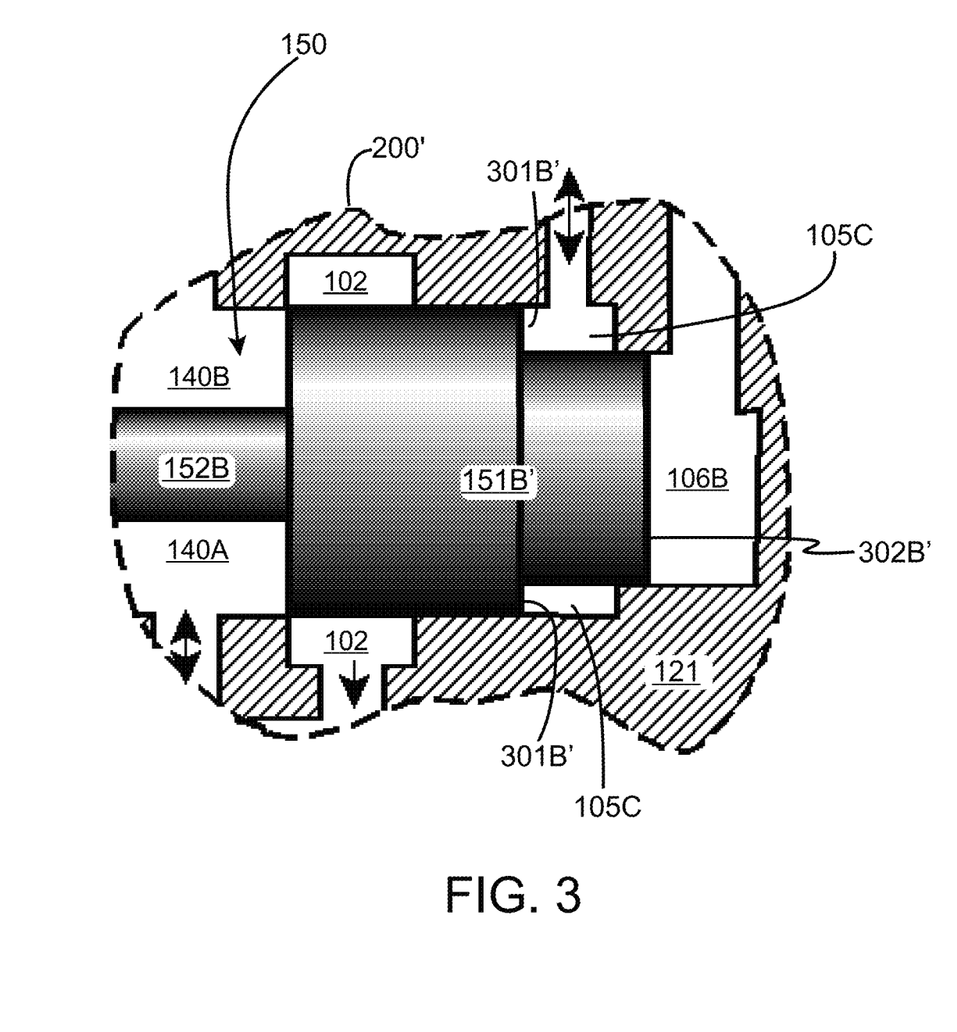
FIG. 3 provides details of a second example embodiment of an improved spool end according to the present invention.

Referring now to FIG. 3, another example embodiment according to the present invention is shown. This improved servo valve does not use the previously-described improved stub pistons such as those of the example embodiment of FIG. 1. Instead, in this embodiment of the invention, the end pistons 151A' and 151B' of the spool 150 are modified to include steps down in diameter to yield the new feedback drive surfaces 301A' and 301B' and reduced drive surfaces 302A' and 302B', wherein 151A', 301A' and 302A' (not shown in this view) are mirror symmetric to 151B', 301B' and 302B' (shown). Similar to the example embodiment of FIG. 1, differential cylinder pressure is applied through new (additional) passageways 105D and 105C to the new end surfaces 301A' and 301B' caused by the formed steps in the end pistons 151A' and 151B' in spool 150. The operation with linear pressure feedback is otherwise similar to the servo valve embodiment with stub pistons, such as the example of FIG. 1.

In other embodiments according to the present invention, smaller actuators may not require stub pistons because they may receive enough flow with smaller valve openings, or their valve spools may have less surface area and thus need less flow for larger valve openings. The stub pistons are to increase spool velocity, i.e., displacement with time, or, more to the point, displacement with volume of fluid from the pilot valve and any connecting passageways. Further, in applications which require only lower frequency response from the actuator, even large actuators may not need stub pistons. Servo valves with stub pistons are referred to as "high response" servo valves.

Figure 4:
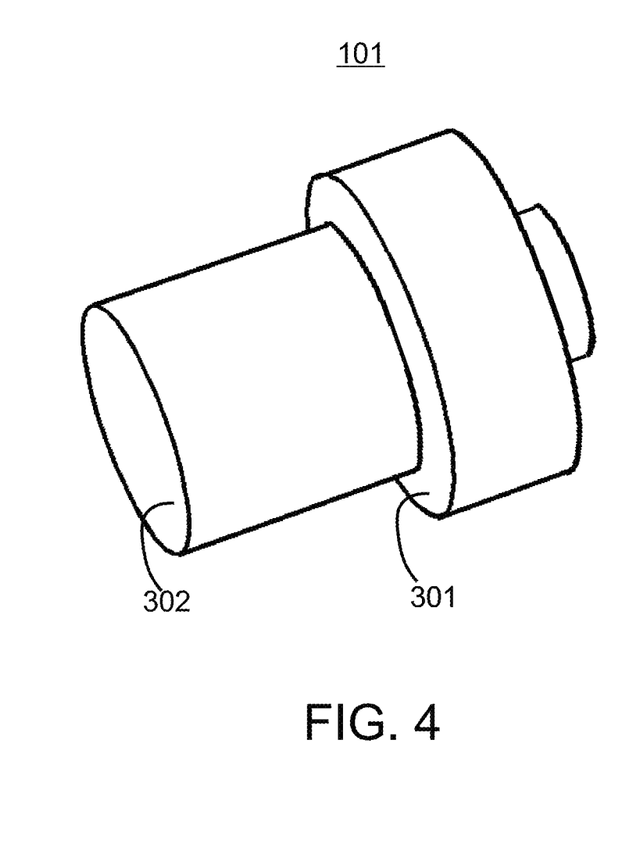
FIG. 4 illustrates an example embodiment of a stub piston according to at least one embodiment of the present invention, such as the embodiment provided in FIG. 1.

Turning now to FIG. 4, an example sub piston 101 is shown in a perspective view in which the diameter of the stub piston is stepped to provide two surfaces, 301 and 302, wherein the larger diameter surface 301 is disposed around the periphery of the smaller diameter surface 302, and wherein the larger diameter surface 301 is formed a distance from the end surface 302. The new feedback pressure from the new passageways is incident upon the larger diameter surface 301, while the conventional feedback pressure and pilot valve output are incident upon the end surface 302. In at least one embodiment, the area of the new end surface (drive surface) 301 is about 30% of the total area (sum) of both surfaces 301 and 302. Other embodiments may adopt other percentage splits between the two surfaces, different amounts of set back from the end of the piston to the new drive surface, and different diameters.

CONCLUSION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The foregoing example embodiments do not define the extent or scope of the present invention, but instead are provided as illustrations of how to make and use at least one embodiment of the invention.

What is claimed is:

1. An improved apparatus for pressure control of a seismic vibrator or vibration machine having a sliding circular valve spool with a left piston, a center piston, a right piston, a left rod disposed between the left piston and the center piston, a right rod disposed between the center piston and the right piston, a left cylinder pressure chamber formed around the left rod for receiving pressurized fluid, a right cylinder pressure chamber formed around the right rod for receiving pressurized fluid, a left feedback passageway sampling pressure from the left cylinder pressure chamber and directing force to a right end drive surface of the spool, and a right feedback passageway sampling pressure from the right cylinder pressure chamber and directing force to a left end drive surface of the spool, the improvement comprising:

a left additional passageway conducting a portion of sampled pressure from the left cylinder pressure chamber to only a portion of the right end drive surface of the spool, wherein the portion of the right end drive surface is less that of the entirety of the right end drive surface; and a right additional passageway conducting a portion of sampled pressure from the right cylinder pressure chamber to only a portion of the left end drive surface of the spool, wherein the portion of the left end drive surface is less that the entirety of the left end drive surface;

thereby providing at least the left and the right additional passageways configured to provide linear proportional pressure feedback in spool movement control.

2. The apparatus of claim 1 wherein an area of the portion of the right end drive surface comprises about 30% of a total area of the right end drive surface, and wherein an area of the portion of the left end drive surface comprises about 30% of a total area of the left end drive surface.

3. The apparatus of claim 1 wherein the portion of the left end drive surface and the portion of the right end drive surface are formed into the left piston and into the right piston, respectively.

4. The apparatus of claim 1 wherein the portion of the left end drive surface and the portion of the right end drive surface are formed into a left stub piston and into a right stub piston, respectively.

5. The apparatus of claim 1 wherein the left additional passageway comprises an extension to the left feedback passageway.

6. The apparatus of claim 1 wherein the right additional passageway comprises an extension to the right feedback passageway.

7. The apparatus of claim 1 wherein the sliding circular valve spool operates in a vertical orientation, and wherein designations of left and right correspond to upper and lower, and up and down, accordingly.

8. A method of manufacture of an improved apparatus for pressure control of a seismic vibrator or vibration machine having a sliding circular valve spool with a left piston, a center piston, a right piston, a left rod disposed between the left piston and the center piston, a right rod disposed between the center piston and the right piston, a left cylinder pressure chamber formed around the left rod for receiving pressurized fluid, a right cylinder pressure chamber formed around the right rod for receiving pressurized fluid, a left feedback passageway sampling pressure from the left cylinder pressure chamber and directing force to a right end drive surface of the spool, and a right feedback passageway sampling pressure from the right cylinder pressure chamber and directing force to a left end drive surface of the spool, the method comprising:
    providing, to a servo valve or vibration machine, a left additional passageway conducting a portion of sampled pressure from the left cylinder pressure chamber to only a portion of the right end drive surface of the spool, wherein the portion of the right end drive surface is less that of the entirety of the right end drive surface; and
    providing, to a servo valve or vibration machine, a right additional passageway conducting a portion of sampled pressure from the right cylinder pressure chamber to only a portion of the left end drive surface of the spool, wherein the portion of the left end drive surface is less that the entirety of the left end drive surface;
    thereby providing at least the left and the right additional passageways configured to provide linear proportional pressure feedback in spool movement control.

9. The method of manufacture of claim 8 wherein an area of the portion of the right end drive surface comprises about 30% of a total area of the right end drive surface, and wherein an area of the portion of the left end drive surface comprises about 30% of a total area of the left end drive surface.

10. The method of manufacture of claim 8 further comprising:
    forming the portion of the left end drive surface into the left piston; and
    forming the portion of the right end drive surface into the right piston.

11. The method of manufacture of claim 8 further comprising:
    providing the portion of the left end drive surface on a left stub piston; and
    providing the portion of the right end drive surface on a right stub piston.

12. The method of manufacture of claim 8 wherein the providing of the left additional passageway comprises providing an extension to the left feedback passageway.

13. The method of manufacture of claim 8 wherein the providing of the right additional passageway comprises providing an extension to the right feedback passageway.

14. The method of manufacture of claim 8 wherein the providing to a servo valve or vibration machine comprises providing to a servo valve or vibration machine in which the sliding circular valve spool operates in a vertical orientation, and wherein designations of left and right correspond to upper and lower, and up and down, accordingly.

15. An improved pressure control method for a seismic vibrator or vibration machine having a sliding circular valve spool with a left piston, a center piston, a right piston, a left rod disposed between the left piston and the center piston, a right rod disposed between the center piston and the right piston, a left cylinder pressure chamber formed around the left rod for receiving pressurized fluid, a right cylinder pressure chamber formed around the right rod for receiving pressurized fluid, a left feedback passageway sampling pressure from the left cylinder pressure chamber and directing force to a right end drive surface of the spool, and a right feedback passageway sampling pressure from the right cylinder pressure chamber and directing force to a left end drive surface of the spool, the method improvement comprising:
    conducting, a left additional passageway, a portion of sampled pressure from the left cylinder pressure chamber to only a portion of the right end drive surface of the spool, wherein the portion of the right end drive surface is less that of the entirety of the right end drive surface; and
    conducting, via a right additional passageway, a portion of sampled pressure from the right cylinder pressure chamber to only a portion of the left end drive surface of the spool, wherein the portion of the left end drive surface is less that the entirety of the left end drive surface;
    thereby providing at least the left and the right additional passageways configured to provide linear proportional pressure feedback in spool movement control.

16. The improved pressure control method of claim 15 wherein the conducting of a portion of sampled pressure from the left feedback passageway to an area of the portion of the right end drive surface comprises conducting of a portion of sampled pressure to about 30% of a total area of the right end drive surface, and wherein the conducting of a portion of sampled pressure from the right feedback passageway to an area of the portion of the left end drive surface comprises about 30% of a total area of the left end drive surface.

17. The improved pressure control method of claim 15 wherein the portion of the left end drive surface and the portion of the right end drive surface are formed into the left piston and into the right piston, respectively.

18. The improved pressure control method of claim 15 wherein the portion of the left end drive surface and the portion of the right end drive surface are formed into a left stub piston and into a right stub piston, respectively.

19. The improved pressure control method of claim 15 wherein the left additional passageway comprises an extension to the left feedback passageway.

20. The apparatus of claim 1 wherein the right additional passageway comprises an extension to the right feedback passageway.

21. The improved pressure control method of claim 15 wherein the sliding circular valve spool operates in a vertical orientation, and wherein designations of left and right correspond to upper and lower, and up and down, accordingly.

* * * * *